United States Patent [19]
Low et al.

[11] 3,712,132
[45] Jan. 23, 1973

[54] DROPLET MONITORING PROBE

[76] Inventors: George M. Low, Deputy Administrator of the National Aeronautics and Space Administration with respect to an invention of; James R. Baughman, 7110 Pomelo Drive, Canoga Park, Calif. 91304; Paul C. Thys, 13208 Goleta, Pacoima, Calif. 91331

[22] Filed: Sept. 23, 1970

[21] Appl. No.: 74,759

[52] U.S. Cl. ............... 73/194 E, 324/30 R, 324/65 P
[51] Int. Cl. ................................................. G01f 3/00
[58] Field of Search ...... 73/29, 194 E, 194 F, 432 PS; 340/239 R; 200/61.05; 128/DIG. 13; 324/71 CP, 65 P, 30 R

[56] References Cited

UNITED STATES PATENTS

| 3,308,648 | 3/1967 | Moulton et al | 324/30 R X |
|---|---|---|---|
| 3,449,952 | 6/1969 | Brown et al | 73/194 E |
| 2,876,414 | 3/1959 | Shaheen | 324/30 R |
| 3,286,167 | 11/1966 | Gwyn | 324/30 R |
| 3,264,558 | 8/1966 | Heeps | 324/65 P |

Primary Examiner—Charles A. Ruehl
Attorney—John R. Manning, J. H. Warden and Monte F. Mott

[57] ABSTRACT

A droplet monitoring system is disclosed for analysis of mixed-phase fluid flow in development of gas turbines. The system uses a probe comprising two electrical wires spaced a known distance apart and connected at one end to means for establishing a DC potential between the wires. A drop in the fluid stream momentarily contacting both wires simultaneously causes an electrical signal which is amplified, detected and counted.

7 Claims, 4 Drawing Figures

PATENTED JAN 23 1973　　3,712,132

INVENTORS
J. R. BAUGHMAN
P. C. THYS
BY J. H. Warden
Monte F. Mott
ATTORNEYS

DROPLET MONITORING PROBE

ORIGIN OF INVENTION

The invention described herein was made in the performance of work under a NASA contract and is subject to the provisions of section 305 of the National Aeronautics and Space Act of 1958, Public Law 85–568 (72 Stat. 435; 42 USC 2457).

BACKGROUND OF THE INVENTION

The present invention relates to a system for analysis of mixed-phase fluid flow, and more particularly to monitoring the propagation of droplets in a fluid stream that is primarily in a gaseous state.

The desirability of increasing the efficiency of turbomachinery has made it necessary to increase rotational speed over the years. Continual development of new, high-strength alloys has made this increase possible. As a result, turbines with tip speeds in excess of 2,000 ft/sec. are now being used in many applications. In applications where vapor cycles are employed, the higher speeds emphasize the recurring problem of turbine blade erosion due to droplet impact. Such applications are found in the power industry as well as in the field of aircraft and space power systems.

The erosion, resulting from impact between the rapidly moving blade and the slow, poorly accelerated drop has been periodically studied, but the phenomenon has never been fully understood, nor has it been possible to predict results for any particular design. The advent of nuclear-powered steam plants, where higher speeds and wetter steam are used, has revived industrial interest, and development of space power systems using potassium and mercury vapors has focused attention to this problem of erosion due to droplet impact. In particular, attention is being given to obtaining a better, more basic understanding of droplet propagation, leading to a method of predicting their presence and giving design information which will minimize their erosive effects.

While the emphasis has been on more basic understanding of droplet propagation in gas turbine developments, such an understanding is equally basic to developments in similar fields where high temperature erosion phenomena requires characterization of the mixed-phase fluid directed against a stationery element such as a baffle or a moving element much like a turbine blade. In the past, the art of fluid state measurement has not provided apparatus for obtaining droplet propagation data on mixed-phase fluid streams.

OBJECTS AND SUMMARY OF THE INVENTION

An object of the invention is to provide a droplet monitoring system for analysis of droplet propagation in mixed-phase fluid streams.

It is a further object of the invention is to provide a droplet sensing probe for use in monitoring mixed-phase fluid streams.

These and other objects of the invention are achieved by a droplet sensing probe comprising two wires spaced a known distance apart in a mixed-phase fluid stream to determine the size and number of droplets being propagated. The probe wires are connected at one end to means for establishing a DC potential between them. A drop of a minimum size determined by the distance between the two probe wires will cause an electrical signal to be developed. An amplifier and detector couple the droplet sensing probe to a counter in order that the number of droplets larger than the probe wire spacing in a period of time may be determined. By varying the probe wire spacing, data on droplet size distribution can be obtained.

The novel features that are considered characteristic of this invention are set forth with particularity in the appended claims. The invention will best be understood from the following description when read in conjunction with the accompanying drawings.

DESCRIPTION OF THE PREFERRED EMBODIMENTS

Figure 1:
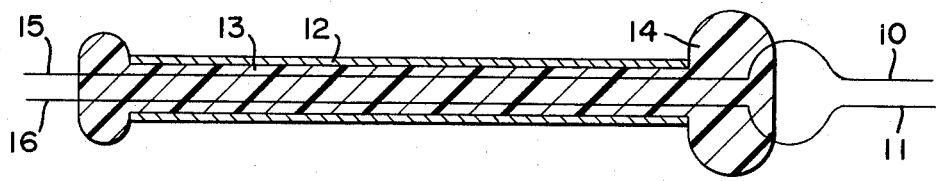
FIG. 1 is a cross-sectional view of a droplet sensing probe in accordance with the present invention.

A first embodiment of the present invention illustrated in FIG. 1 utilizes two wires 10 and 11 spaced a known distance apart and supported in a metal sheath 12 filled with a synthetic plastic or resin 13. The construction is very much like that of a thermocouple probe but with the dissimilar metals in the form of wires disconnected at the end and spaced throughout a substantial length of their exposed ends as shown. The synthetic plastic or resin 13 in the sheath 12 is extended and formed into a small ball 14 to support the base of the wires 10 and 11 with greater spacing than is desired over the rest of the wires in order to avoid collection of fluid in the liquid state between the wires where they enter the insulation. This is desirable because oscillation and breakaway of this fluid in a liquid state causes a variation in the droplet count.

In operation, a DC potential is established between ends 15 and 16 of the respective wires 10 and 11. A droplet of a minimum size determined by the spacing between the wires 10 and 11 contacting both wires simultaneously will cause current to flow through the wires, thereby providing a signal which can be detected and recorded, as by an oscilloscope or a counter. Thus, by counting these signals, droplet propagation data is obtained, and by varying the spacing, droplet distribution data can be obtained.

Tests have shown that probe sensitivity was only slightly dependent on the conductivity of the droplet fluid. Even fluids with poor electrical properties have produced satisfactory results, such as monoisopropylbiphenol (a heat transfer fluid used to drive turbo-alternators), by simply increasing the DC potential applied to the probe. Voltages from 1.5 to 45 VDC have been used. Tests have also shown that the diameter of the probe wires be no larger than the wire spacing. Good results are obtained if the spacing between the wires is approximately equal to the wire diameter, but the best operating point is somewhat dependent on both vapor and droplet velocity at the time of impact. Large wire diameters relative to the spacing cause complete bridging of the fluid accumulated on the wires, even with high velocity streams. Good results have been obtained using a large spacing (350 microns) and a correspondingly large wire diameter, and equally good results have been obtained using wires of small diameter (75 microns) spaced 200 microns apart. For accuracy, calibration of the probe may be accomplished by using high speed photography with droplets of known size and number.

Figure 2:
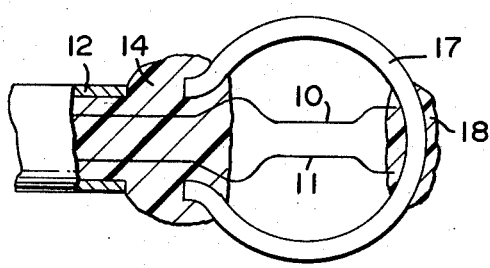
FIG. 2 is a modification of the droplet sensing probe of FIG. 1.

The unsupported lengths of the wires 10 and 11 may, in some applications, result in excessive vibration, such as under conditions existing in a steam turbine. To eliminate vibration, a modified probe construction is preferred in the form illustrated in FIG. 2, wherein like elements are identified by the same reference numerals as in FIG. 1. The modification consists of a supporting ring 17 secured by the ball 14 of synthetic plastic or resin. The free ends of the wires 10 and 11 are secured to the ring 17 by a glob 18 of synthetic plastic or resin. To avoid collection of fluid in the liquid state where the wires 10 and 11 enter the glob 18, the wires are separated a distance significantly greater than the spacing desired at the center of the ring.

It should be noted that although the ring 17 is shown open in the ball 14 to facilitate centering the wires 10 and 11 in the plane of the ring, that is not essential. In practice, the wires 10 and 11 may be supported by the ring in a plane totally outside of the ring.

Figure 3:
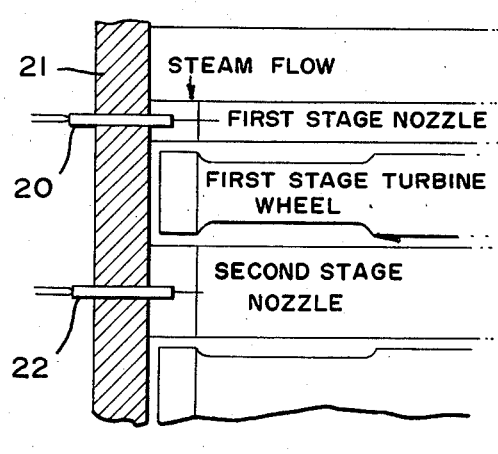
FIG. 3 illustrates schematically the manner in which droplet sensing probes provided in accordance with the present invention may be used for droplet propagation studies in a steam turbine.

The manner in which a droplet sensing probe of either embodiment may be used is illustrated in FIG. 3 which shows schematically a two-stage steam turbine. A first probe 20 is inserted through a wall 21 of the turbine into the path of steam flow through the first stage nozzle to obtain droplet propagation data flowing into the first stage turbine wheel. Since significant condensation of steam will result from flow through the first stage, a second probe 22 inserted through the turbine wall 21 into the second stage nozzle may be provided with greater spacing between its wires. By varying the wire spacing in each of the probes 20 and 22, droplet size distribution in the first and second stages of the turbine may be obtained.

Figure 4:
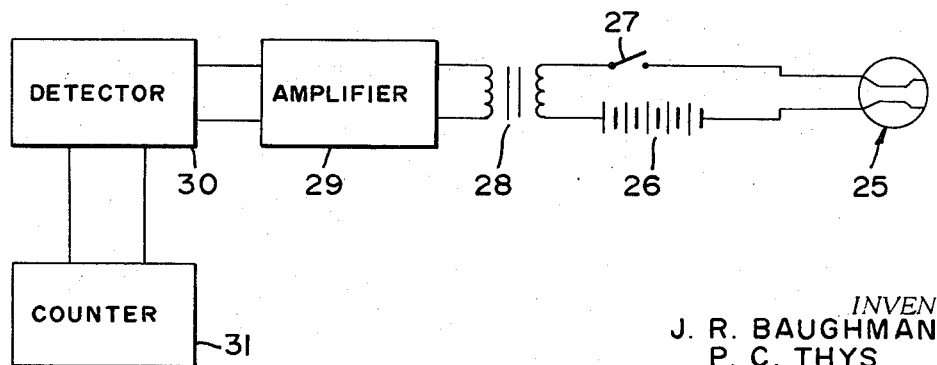
FIG. 4 is a block diagram of a droplet monitoring system of the present invention.

A preferred system for detecting and recording droplets will now be described with reference to FIG. 4. The two wires of a droplet sensing probe 25 are connected to a source of DC potential illustrated as a battery 26 through switch 27 and the primary winding of a transformer 28. While the switch is closed, a droplet contacting both wires of the probe 25 will cause the current to flow through the primary of the transformer, thereby inducing a signal in the second winding which is connected to an amplifier 29. Amplification of the signal improves sensitivity, but also increases outside signal interference. However, standard shielding techniques will isolate and eliminate this outside signal interference.

It should be noted that use of the transformer for coupling the probe 25 to the amplifier 29 is not essential, but is desirable because the probe 25 will tend to produce an independent EMF which, in many cases, is greater than the voltage signal produced by a droplet contacting both wires of the probe 25. This EMF is essentially a DC voltage that is isolated from the amplifier 29 by the transformer 28. Conventional amplifier design techniques may be employed to further increase sensitivity and the signal to noise ratio of the monitoring system.

The amplified signal produced by droplet impacting the wires of the probe 25 are detected by a detector 30 which preferably includes in its output stage a pulse shaping circuit to provide pulses of predetermined amplitudes to a counter 31. For example, the detector 30 may comprise a conventional differential amplifier followed by a Schmitt trigger circuit which provides a square wave. When a pulse produced by an impacting droplet on the probe exceeds a predetermined threshold level set by a reference voltage applied to the Schmitt trigger circuit, the leading edge of the square wave thus produced may then be differentiated to trigger a relaxation oscillator which will produce a pulse of standard height and width for reliable counting by the counter 31. Thus every droplet signal is counted unless a second droplet produces a signal prior to decay of the signal produced by a preceding droplet. Calibration performed in the manner suggested hereinbefore shows that this may occur about ten percent of the time. Accordingly, the recorded droplet count should normally be increased by 10 percent. Droplet counts of 600 per sec. have been obtained with this monitoring system using for the detector the pulse output terminal of a Hewlett-Packard Frequency Meter Model 550B having a freqence sensitivity from 3 Hz to 100 KHz and an amplitude sensitivity from 0.2 to 150 volts RMS.

It should be noted that the approach angle of the droplets will change the sensitivity of the probe to droplet size since smaller droplets can bridge the space between the probe wires if the approach angle is other than 90°. Accordingly, if a probe cannot be mounted with the plane of the probe normal to the stream, an obliquity factor must be used to determine the minimum size of droplets being detected.

In practice, some difficulty was experienced with probe wire deterioration while using higher probe potentials apparently caused by excessive current flow while the probe wires were completely shorted with fluid. This was corrected by holding the switch 27 open except when conditions were acceptable for counting. In addition, various materials have been used to increase probe life and improve performance, such as stainless steel and platinum.

Use of this droplet monitoring system has provided some imperical verification of analytical studies of mixed-phase fluid flows. Other uses and advantages will occur to those skilled in the art in the imperical investigation of a wide spectrum of fluid dynamics problems, particularly for equipment development of high energy level power systems.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A droplet sensing probe comprising a sheath, and two wires passing through said sheath, each electrically isolated from the other and from said sheath by dielectric material, said wires extending from one end of said sheath for the purpose of making electrical connections thereto, and from an opposite end in a substantially parallel arrangement over at least a portion of each for the purpose of sensing a droplet impacting said two wires simultaneously as a momentary short circuit between said two wires produced by said droplet, said wires being spaced a predetermined distance apart throughout said portion of each and at greater distances over a portion of each next to said sheath and dielectric material.

2. A droplet sensing probe as defined in claim 1 including non-conducting means extending from said sheath at said opposite end for supporting said two wires at ends thereof remote from said sheath.

3. A droplet sensing probe as defined in claim 2 wherein said wires are spaced at greater distances than said predetermined distance over a portion of each next to said non-conducting supporting means.

4. A droplet monitoring system using a probe comprised of two wires for analysis of droplet propagation in a mixed-phase fluid stream of high velocity comprising:

a sheath for supporting said two wires in said stream, each wire substantially in a plane normal to the direction of flow of said fluid stream and electrically insulated by dielectric material filling said sheath except at one end thereof in said stream, said two wires being parallel to each other over a substantial portion of their uninsulated ends, and said parallel portions being spaced a predetermined distance apart;

a frame rigidly connected to said sheath at the end thereof from which said uninsulated ends of said wires protrude, said frame supporting said uninsulated ends of said wires at points remote from said sheath;

means for energizing one of said two wires at a potential distinct from the potential of the other wire;

means for detecting a change in potential between said two wires produced by a droplet passing between said uninsulated ends of said wires when said droplet contacts both wires simultaneously; and means responsive to said detecting means for recording each change in potential detected.

5. A droplet monitoring system as defined in claim 4 wherein said uninsulated ends of said two wires are spaced apart by said supporting frame a distance greater than said predetermined distance on each side of said parallel portions thereof.

6. A droplet monitoring system as defined in claim 5 wherein said recording means comprises a counter.

7. A droplet monitoring system as defined in claim 6 wherein said energizing means comprises:

a voltage source having first and second terminals with a predetermined potential therebetween, and having said first terminal connected to one wire; and a transformer having a primary winding connected between said second terminal and the other of said two wires while said system is in use.

* * * * *